United States Patent
Balasubramanian et al.

(10) Patent No.: US 11,567,841 B1
(45) Date of Patent: Jan. 31, 2023

(54) DATABASE SYSTEM

(71) Applicant: Freshworks Inc., San Mateo, CA (US)

(72) Inventors: Krishnanand Nemmara Balasubramanian, San Mateo, CA (US); Suresh Kumar Ponnusamy, San Mateo, CA (US); Premkumar Patturaj, San Mateo, CA (US); Rahul Agarwal, San Mateo, CA (US)

(73) Assignee: FRESHWORKS INC., San Mateo, CA (US)

( * ) Notice: Subject to any disclaimer, the term of this patent is extended or adjusted under 35 U.S.C. 154(b) by 0 days.

(21) Appl. No.: 17/449,193

(22) Filed: Sep. 28, 2021

(51) Int. Cl.
*G06F 11/00* (2006.01)
*G06F 11/20* (2006.01)
*G06F 16/23* (2019.01)

(52) U.S. Cl.
CPC ...... *G06F 11/2028* (2013.01); *G06F 11/2007* (2013.01); *G06F 11/2035* (2013.01); *G06F 11/2048* (2013.01); *G06F 16/23* (2019.01); *G06F 2201/85* (2013.01)

(58) Field of Classification Search
CPC ............. G06F 11/2007; G06F 11/2028; G06F 11/2035; G06F 11/2048; G06F 2201/85
See application file for complete search history.

(56) References Cited

U.S. PATENT DOCUMENTS

| | | | | |
|---|---|---|---|---|
| 7,937,617 B1 * | 5/2011 | Nagineni | ............ | G06F 11/2046 714/13 |
| 2017/0295236 A1 * | 10/2017 | Kulkarni | ............. | H04L 67/1097 |
| 2021/0133183 A1 * | 5/2021 | Biswas | .................. | H04L 67/101 |
| 2021/0144177 A1 * | 5/2021 | Tsirkin | .................... | H04L 63/20 |

* cited by examiner

*Primary Examiner* — Michael Maskulinski
(74) *Attorney, Agent, or Firm* — Dinsmore & Shohl LLP (57) ABSTRACT

The present disclosure relates to a method of operating a database system. The database system comprises: a database; a first compute node comprising a first database proxy; and a second compute node comprising a second database proxy. The method comprises receiving and processing, at the first database proxy, a first plurality of access requests to access the database; receiving and processing, at the second database proxy, a second plurality of database access requests to access the database; monitoring for a failure event associated with the first database proxy; and, in response to the monitoring indicating a failure event, initiating a failover procedure between the first database proxy and the second database proxy. The failover procedure comprises: redirecting the first plurality of access requests to the second database proxy; and processing, at the second database proxy, the first plurality of access requests.

15 Claims, 3 Drawing Sheets

DATABASE SYSTEM

BACKGROUND

Field

The present disclosure concerns database systems. The present disclosure also concerns methods of operating a database system and a non-transitory computer-readable storage medium comprising computer-executable instructions which, when executed by a processor, cause a computing device to perform a method of operating a database system.

Description of the Related Technology

Software services (for example, Software as a Service (SaaS) services) often rely on one or more underlying databases containing user and/or configuration data. Access to these underlying databases is typically managed by a database system, which serves to facilitate and manage access by the software service to the database. However, as the number of users of a software service increases, so does the demand on the database system. Thus, as the user base of the software service increases, the processing capacity of any underlying database system (i.e. the rate at which the database system can process and respond to access requests) must also scale accordingly.

Database systems can be scaled up by using a master-slave architecture, in which users are assigned to one of a number of compute nodes facilitating access to the database. In such cases, each of the compute nodes operates to serve a share of the total number of users of the software service. However, such architectures are vulnerable to failure of individual compute nodes (or parts thereof), which can result in the software service failing for the share of users serviced by those compute nodes. Furthermore, such an architecture can result in large numbers of connections to the database itself, which complicates the management and operation of the database.

The present disclosure seeks to mitigate the above-mentioned problems. Alternatively or additionally, the present disclosure seeks to provide an improved database system.

SUMMARY

A first aspect of the present disclosure relates to a method of operating a database system, the database system comprising: a database; a first compute node comprising a first database proxy; and a second compute node comprising a second database proxy, the method comprising: receiving, at the first database proxy, a first plurality of access requests to access the database; processing, at the first database proxy, the first plurality of access requests; receiving, at the second database proxy, a second plurality of access requests to access the database; processing, at the second database proxy, the second plurality of access requests; monitoring for a failure event associated with the first database proxy; and in response to the monitoring indicating a failure event associated with the first database proxy, initiating a failover procedure between the first database proxy and the second database proxy, the failover procedure comprising: redirecting the first plurality of access requests to the second database proxy; and processing, at the second database proxy, the first plurality of access requests.

A second aspect of the present disclosure relates to a non-transitory computer-readable storage medium comprising computer-executable instructions which, when executed by a processor, cause a computing device to perform a method of operating a database system, the database system comprising: a database; a first compute node comprising a first database proxy; and a second compute node comprising a second database proxy, the method comprising: receiving, at the first database proxy, a first plurality of access requests to access the database; processing, at the first database proxy, the first plurality of access requests; receiving, at the second database proxy, a second plurality of access requests to access the database; processing, at the second database proxy, the second plurality of access requests; monitoring for a failure event associated with the first database proxy; and in response to the monitoring indicating a failure event associated with the first database proxy, initiating a failover procedure between the first database proxy and the second database proxy, the failover procedure comprising: redirecting the first plurality of access requests to the second database proxy; and processing, at the second database proxy, the first plurality of access requests.

A third aspect of the present disclosure relates to a database system comprising: a database; a first compute node comprising a first database proxy; and a second compute node comprising a second database proxy, wherein: the first database proxy is configured to receive a first plurality of access requests to access the database and to process the first plurality of access requests; the second database proxy is configured to receive a second plurality of access requests to access the database and to process the second plurality of access requests; the first compute node is configured to monitor for a failure event associated with the first database proxy and, in response to the monitoring indicating a failure event associated with the first database proxy, initiate a failover procedure between the first database proxy and the second database proxy; and the failover procedure comprises: redirecting the first plurality of access requests to the second database proxy; and processing, at the second database proxy, the first plurality of access requests.

It will of course be appreciated that features described in relation to one aspect of the present disclosure may be incorporated into other aspects of the present disclosure. For example, the method of the present disclosure may incorporate any of the features described with reference to the apparatus of the present disclosure and vice versa.

DETAILED DESCRIPTION OF CERTAIN INVENTIVE EMBODIMENTS

Figure 1:
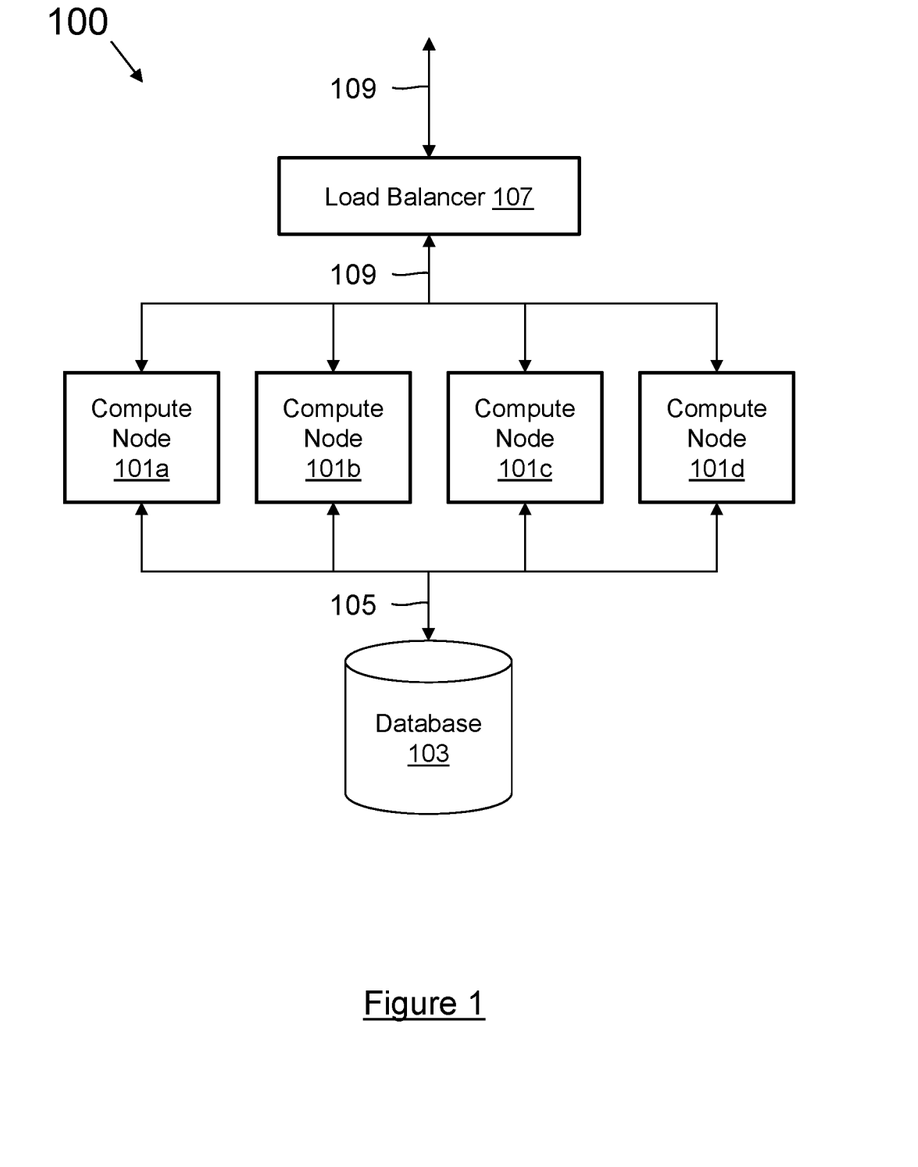
FIG. 1 shows a functional block diagram of a database system according to embodiments of the present disclosure.

FIG. 1 shows a functional block diagram of a database system 100 according to embodiments of the present disclosure.

Database system 100 comprises a first compute node 101a and a second compute node 101b. In embodiments, database 100 comprises one or more further compute nodes 101c, 101d. Whilst, in the illustrated embodiments, database system 100 comprises four compute nodes, it will be appreciated by the skilled person that, in other embodiments, database system 100 may comprise more or fewer compute nodes (for example, determined based on the expected demand profile of database system 100).

In embodiments, database system 100 comprises a database 103. In embodiments, compute nodes 101a, 101b, 101c, 101d are configured to provide a database access service to facilitate access to database 103. In such embodiments, it may be that the database access service facilitates access to database 103 by one or more applications. In embodiments, facilitating access to database 103 comprises enabling retrieval of data from and/or writing data to and/or manipulation of data stored in database 103. Thus, in embodiments, compute nodes 101a, 101b, 101c, 101d are configured to communicate database queries and replies 105 between one or more applications and database 103.

In embodiments, database system 100 comprises a virtualized environment and the number of compute nodes employed (for example 'instantiated' or 'spun-up' by an orchestrator component (not shown) or other supervisor entity) changes according to the current/expected access demand on database 103.

In embodiments, database system 100 comprises a load balancer 107. In embodiments, load balancer 107 is configured to distribute software service data 109 (for example, SaaS service data) associated with one or more software services (for example, SaaS services) between compute nodes 101a, 101b, 101c, 101d (for example, in order to provide an efficient distribution of computation between compute nodes 101a, 101b, 101c, 101d). In embodiments, load balancer 107 is configured to receive incoming software service data 109 (for example, associated with one or more software services). In such embodiments, load balancer 107 is configured to allocate software service data 109 to one or more of compute nodes 101a, 101b, 101c, 101d associated with the one or more software services. In embodiments, load balancer 107 is configured to selectively allocate software service data 109 to one or more of compute nodes 101a, 101b, 101c, 101d in order to spread the computation associated with software service data 109 across compute nodes 101a, 101b, 101c, 101d. Thus, in embodiments, load balancer 107 is configured to allocate a first portion of software service data 109 to first compute node 101a and a second different portion of software service data 109 to second compute node 101b. In such embodiments, it may be that first compute node 101a is configured to perform computation associated with the first portion of software service data 109 and second compute node 101b is configured to perform computation associated with the second portion of software service data 109. Thus, in embodiments, load balancer 107 can be said to balance the distribution of computation (known as "load balancing") between one or more of compute nodes 101a, 101b, 101c, 101d. Thus, in embodiments, compute nodes 101a, 101b, 101c, 101d together comprise a pool of computing resources for use in providing a database access service. It will be appreciated by the skilled person that, whilst the functionality of load balancer 107 is described above in respect of two compute nodes, load balancer 107 may be configured to provide load balancing across any number of compute nodes.

Figure 2:
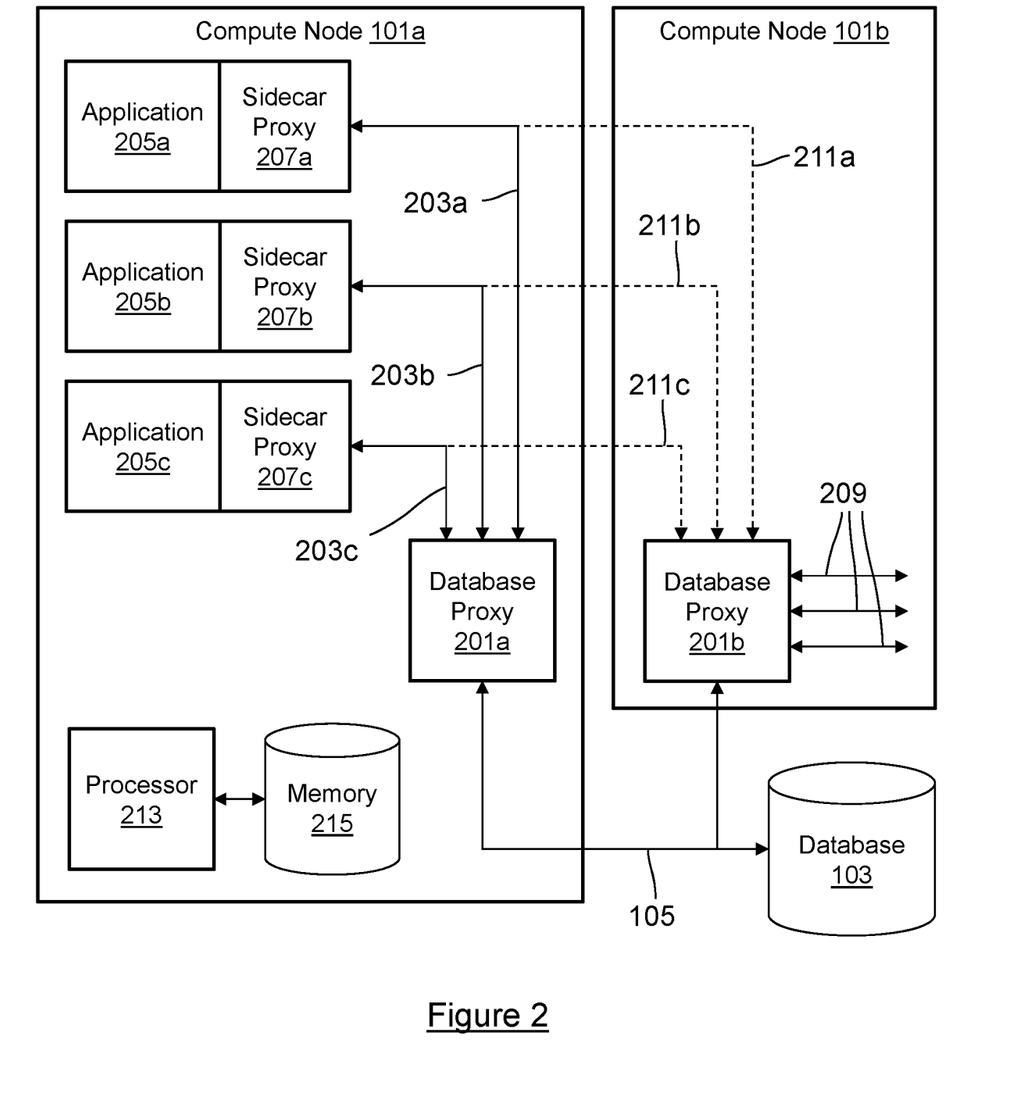
FIG. 2 shows a more detailed diagram of the database system of FIG. 1 according to embodiments of the present disclosure.

FIG. 2 shows a more detailed diagram of database system 100 according to embodiments of the present disclosure.

In the embodiments of FIG. 2, first compute node 101a comprises a first database proxy 201a. First database proxy 201a is configured to receive a first plurality of access requests 203a, 203b, 203c to access database 103. In embodiments, an access request comprises a database query (for example, a request to retrieve information from, a request to write information to and/or a request to manipulate data stored in database 103). In embodiments, a successful access request (for example, one which has been fulfilled, i.e. completed) also includes the reply from database 103 to the query (for example, return of the requested information or confirmation that the requested data manipulation has been completed). In embodiments, the access requests comprise one or more Structured Query Language (SQL) messages. First database proxy 201a is further configured to process the first plurality of access requests 203a, 203b, 203c. In embodiments, processing first plurality of access requests 203a, 203b, 203c comprises communicating with database 103 (for example, communicating database requests and replies 105) in order to fulfil the first plurality of access requests 203a, 203b, 203c.

In embodiments, first compute node 101a comprises a plurality of applications 205a, 205b, 205c. In embodiments, applications 205a, 205b, 205c are configured to generate access requests to access the database (for example, in order to retrieve information required for operation of the respective application). In embodiments, first plurality of access requests 203a, 203b, 203c are generated by applications 205a, 205b, 205c. In embodiments, each of applications 205a, 205b, 205c is configured to generate a respective one of first plurality of access requests 203a, 203b, 203c. In embodiments, application 205a is configured to generate a first access request 203a in the plurality. In embodiments, application 205b is configured to generate a second access request 203b in the plurality. In embodiments, application 205c is configured to generate a third access request 203c in the plurality. It will be appreciated by the skilled person that, in embodiments, a given application may generate more than one access request. Thus, in embodiments, first plurality of access requests 203a, 203b, 203c comprises more than one access request per application comprised in first compute node 101a.

In embodiments, applications 205a, 205b, 205c are associated with a database access service provided to a user. In embodiments, plurality of applications 205a, 205b, 205c are associated with (for example, configured to provide) one or more software services (for example, SaaS services). In embodiments, the user comprises a person (for example, interacting with the application via a computing device). Alternatively, in embodiments, the user comprises a computer program (for example, configured to interact with the application in order to fulfil its own functions). In embodiments, applications 205a, 205b, 205c comprise one or more of a web server, a mail server, and an application server. It will be appreciated by the skilled person that, whilst in the embodiments illustrated by FIG. 2 first compute node 101a comprises three applications, in other embodiments first compute node 101a may comprise more or fewer applications.

In embodiments, first compute node 101a comprises a plurality of sidecar proxies 207a, 207b, 207c. In such embodiments, it may be that each of plurality of sidecar proxies 207a, 207b, 207c is associated with a respective one of plurality of applications 205a, 205b, 205c. Thus, in embodiments, first application 205a is associated with first sidecar proxy 207a. In embodiments, second application 205b is associated with second sidecar proxy 207b. In embodiments, third application 205c is associated with third sidecar proxy 207c. It will be appreciated by the skilled person that, whilst in the embodiments illustrated by FIG. 2 first compute node 101a comprises three sidecar proxies, in other embodiments (for example, those having more or fewer applications than three) first compute node 101a may comprise more or fewer sidecar proxies (for example, an equal number to the number of applications). In embodiments, plurality of sidecar proxies 207a, 207b, 207c are configured to facilitate communication of first plurality of access requests 203a, 203b, 203c between plurality of applications 205a, 205b, 205c and first database proxy 201a. Providing each application with a sidecar proxy (for example, a sidecar container) can reduce latency associated with access requests.

In embodiments, second compute node 101b comprises a second database proxy 201b. In embodiments, second database proxy 201b is configured to receive a second plurality of access requests 209 to access database 103. Second database proxy 201b is further configured to process second plurality of access requests 209. In embodiments, processing second plurality of access requests 209 comprises communicating with database 103 (for example, communicating database requests and replies 105) in order to fulfil second plurality of access requests 209. Thus, each of first compute node 101a and second compute node 101b comprises a database proxy configured to receive and process access requests to access database 103.

Second compute node 101b comprises a second database proxy 201b. Second database proxy 201b is configured to receive a second plurality of access requests to access database 103. Second database proxy 201b is further configured to process the second plurality of access requests. In embodiments, second compute node 101b comprises a further plurality of applications (not shown). In embodiments, the further plurality of applications are configured to generate access requests to access database 103. In such embodiments, it may be that the further plurality of applications are configured to generate the second plurality of access requests 209. In embodiments, second compute node 101b comprises a further plurality of sidecar proxies (not shown). In embodiments, each of the further plurality of sidecar proxies is associated with a respective one of the further plurality of applications. In such embodiments, it may be that the further plurality of sidecar proxies are configured to facilitate communication between the further plurality of applications and second database proxy 201b.

In embodiments, first compute node 101a is configured to monitor for a failure event associated with first database proxy 201a. In embodiments, first compute node 101a is configured to, in response to the monitoring indicating a failure event associated with the first database proxy, initiate a failover procedure. In embodiments, the failure event comprises a failure of the first database proxy. In embodiments, the failure event comprises a communication failure associated with the first database proxy.

In embodiments, the monitoring is performed by at least one of plurality of sidecar proxies 207a, 207b, 207c in first compute node 101a. In embodiments, each of sidecar proxies 207a, 207b, 207c is configured to monitor for the failure event. In embodiments, one or more (but, for example, not all) of sidecar proxies 207a, 207b, 207c are configured to monitor for the failure event. In such embodiments, it may be that one or more of sidecar proxies 207a, 207b, 207c (for example, those sidecar proxies configured to monitor for the failure event) are configured to transmit a notification to one or more other sidecar proxies (for example, those sidecar proxies not configured to monitor for the failure event) indicating that a failure event has been detected. In embodiments, the monitoring is performed by a supervisor module (not shown). In such embodiments, it may be that the supervisor module is configured to, in response to the monitoring indicating a failure event, transmit a notification to one or more (for example, all) of sidecar proxies 207a, 207b, 207c indicating that a failure event has been detected.

In embodiments, the monitoring comprises probing the first database proxy at predetermined intervals for confirmation of correct operation of the first database proxy. For example, in embodiments, the monitoring comprises periodically transmitting (for example, by each of plurality of sidecar proxies 207a, 207b, 207c) a status request to first database proxy 201a. In such embodiments, it may be that the monitoring comprises monitoring for a failure (for example, repeated failure) to respond to status requests. In embodiments, the monitoring comprises monitoring for a predetermined number of failed access requests. In embodiments, the monitoring comprises monitoring for a predetermined period of time having elapsed since the last successfully completed access request.

In embodiments, the failover procedure comprises redirecting first plurality of access requests 203a, 203b, 203c to second database proxy 201b. In embodiments, redirecting first plurality of access requests 203a, 203b, 203c comprises generating duplicate access requests for transmission to second database proxy 201b. Thus, in such embodiments, it may be that the failover procedure comprises generating a plurality of redirected access requests 211a, 211b, 211c. In such embodiments, the failover procedure comprises processing, at second database proxy 201b, redirected access requests 211a, 211b, 211c. In such embodiments, it may be that second database proxy 201b is configured to access database 103 to fulfil redirected access requests 211a, 211b, 211c (for example, in communication with plurality of sidecar proxies 207a, 207b, 207c in first compute node 101a). In embodiments, first database proxy 201a and second database proxy 201b are within a single availability zone. In embodiments, first compute node 101a and second compute node 101b are within a single availability zone. Thus, in embodiments, the redirecting comprises redirecting first plurality of access requests 203a, 203b, 203c to a further database proxy within the same availability zone as first database proxy 201a.

By redirecting the first plurality of requests to second database proxy 201b in second compute node 101b, database system 100 can continue to service plurality of applications 205a, 205b, 205c in the event of a failure of first database proxy 201a (or of communication with first database proxy 201a). Thus, database system 100 provides increased availability of database system 100. Redirecting access requests to a further database proxy within the same availability zone can prevent the need for inter-availability zone communication, and thereby maintain the functional independence of the availability zones.

In embodiments, plurality of sidecar proxies 207a, 207b, 207c are configured to, in response to the monitoring indicating a failure event associated with first database proxy 201a, redirect access requests associated with the respective sidecar proxies to second database proxy 201b. Thus, in embodiments, the redirecting is performed by one or more of plurality of sidecar proxies 207a, 207b, 207c in first compute node 101a. In embodiments, each sidecar proxy is configured to independently monitor for the failure event and, in response to detecting a failure event, redirect access requests associated with that sidecar proxy to second database proxy 201b. In embodiments in which a subset of the sidecar proxies 207a, 207b, 207c are configured to monitor for the failure event and transmit a notification to the one or more other sidecar proxies indicating that a failure event has been detected, the one or more other sidecar proxies may be configured to redirect access requests in response to receipt of the notification. Similarly, in embodiments in which the monitoring is performed by a supervisor module, it may be that the plurality of sidecar proxies 207a, 207b, 207c are configured to redirect access requests in response to receipt of a notification from the supervisor module indicating that a failure event has been detected.

In embodiments, first compute node 101a is configured to store (for example, in a memory 215) failover address information for second database proxy 201b. In such embodiments, it may be that the redirecting is performed on the basis of the stored failover address information.

In embodiments, it may be that each of plurality of sidecar proxies 207a, 207b, 207c is configured to store individual failover address information specific to that sidecar proxy. In embodiments, one or more sidecar proxies within first compute node 101a comprises stored failover address information which differs from that of one or more other sidecar proxies within first compute node 101a. Thus, in embodiments, redirecting first plurality of access requests 203a, 203b, 203c comprises redirecting, by one or more of plurality of sidecar proxies 207a, 207b, 207c in first compute node 101a, access requests associated with the respective sidecar proxies to a third database proxy (not shown) in a third compute node. In embodiments, each of the compute nodes in database system 100 comprises a database proxy. Providing each compute node with a database proxy can reduce the number of connections to database 103. In embodiments, redirecting first plurality of access requests 203a, 203b, 203c comprises redirecting access requests 203a, 203b, 203c to a plurality of compute nodes. In embodiments, plurality of access requests 203a, 203b, 203c are redirected to more than two other compute nodes, for example more than three other compute nodes, more than five other compute nodes, or more ten other compute nodes. In embodiments, a single sidecar proxy is configured to redirect access requests to multiple database proxies. Redirecting plurality of access requests 203a, 203b, 203c to a number of different compute nodes reduces the increase in the number of access requests to be serviced by each of the other compute nodes as a result of the failure event. This reduces service degradation resulting from the failure event.

In embodiments, first compute node 101a is configured to monitor for recovery of first database proxy 201a. In embodiments (for example, where the failure event comprises a loss of successful communication between sidecar proxies 207a, 207b, 207c and first database proxy 201a), recovery of first database proxy 201a may comprise a resumption of successful communication between sidecar proxies 207a, 207b, 207c and first database proxy 201a. In embodiments (for example, where the failure event comprises a complete failure of first database proxy 201a) recovery of first database proxy 201a may comprise re-initialization (or 'reboot') of first database proxy 201a or instantiation in first compute node 101a of a replacement database proxy (for example, configured to assume the functionality of first database proxy 201a).

In embodiments, first compute node 101a is configured to, in response to the monitoring indicating recovery of first database proxy 101a, initiate a failover recovery procedure between second database proxy 201b and first database proxy 201a. In embodiments, the failover recovery procedure comprises resuming transmission to and processing by first database proxy 201a of subsequent access requests associated with plurality of applications 205a, 205b, 205c. In embodiments, the failover recovery procedure comprises, at the plurality of sidecar proxies, resuming facilitating communication of subsequent access requests to access the database with first database proxy 201a. In such embodiments, it may be that the failover recovery procedure comprises processing, at first database proxy 201a, the subsequent access requests. By monitoring for recovery of first database proxy 201a and resuming communication of subsequent access requests to first database proxy 201a, database system 100 operates to restore normal (i.e. non-failover) operation of database system 100 autonomously. This reduces the duration of any service degradation resulting from the failure event.

In embodiments, each of compute nodes 101a, 101b, 101c, 101d is configured to operate substantially as described above in respect of first compute node 101a. In embodiments, each of the compute nodes may comprise a database proxy. In embodiments, each of the compute nodes is configured to monitor for a failure event associated with the respective database proxy. In embodiments, each of the compute nodes is configured to, in response to the monitoring indicating a failure event associated with the respective database proxy, redirect access requests associated with the database proxy to one or more alternative database proxies in one or more of the other compute nodes.

In embodiments, database system 100 comprises a virtualized environment. In such embodiments, it may be that processing resources in one or both of first compute node 101a and second compute node 101b comprise virtualized workloads in a cloud computing network. In embodiments, one or more of plurality of applications 205a, 205b, 205c and plurality of sidecar proxies 207a, 207b, and 207c are configured in the virtualized environment as virtual machines. In embodiments, one or more of plurality of applications 205a, 205b, 205c and plurality of sidecar proxies 207a, 207b, and 207c are configured in the virtualized environment as containers.

First compute node 101a comprises a processor 213 (or processing system) and an associated memory 215. It may be that some or all of the functionality of plurality of applications 205a, 205b, 205c, plurality of sidecar proxies 207a, 207b, 207c and/or first database proxy 201a is implemented partially or wholly by processor 213 (for example, by executing instructions stored in memory 215). Similarly, in embodiments, second compute node 101b comprises a further processor (not shown) and an associated further memory (not shown). It may be that some or all of the functionality of the further plurality of applications, further plurality of sidecar proxies, and/or second database proxy 201b is implemented partially or wholly by the further processor (for example, by executing instructions stored in the further memory). It will be appreciated by the skilled person, that, where database system 100 comprises more than two compute nodes, it may be that each of the compute nodes comprises a processor and associated memory, and that any or all of the functionality of those compute nodes may be implemented by the respective processor in conjunction with the respective memory.

Figure 3:
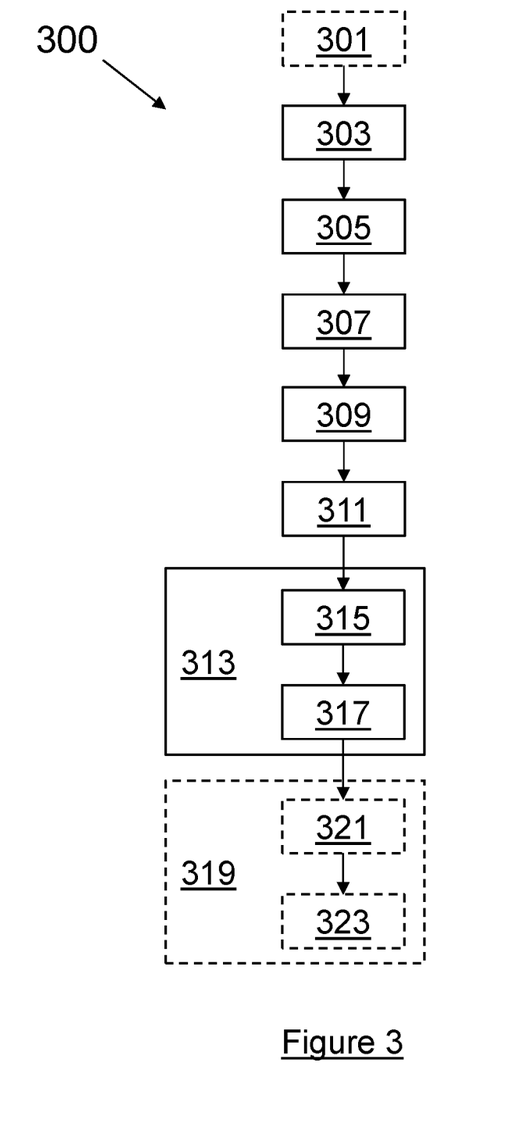
FIG. 3 shows a flow chart illustrating a method of operating a database system according to embodiments of the present disclosure.

FIG. 3 shows a flow chart illustrating a method 300 of operating a database system according to embodiments of the present disclosure. The database system comprises, a database, a first compute node comprising a first database proxy, and a second compute node comprising a second database proxy.

In embodiments, the first compute node comprises a plurality of applications. In such embodiments, it may be that the plurality of applications is configured to generate access requests to access the database. In embodiments, the first compute node comprises a plurality of sidecar proxies. In embodiments, each of the plurality of sidecar proxies is associated with a respective one of the plurality of applications. In such embodiments, it may be that the plurality of sidecar proxies are configured to facilitate communication of the first plurality of access requests between the plurality of applications and the first database proxy. In embodiments, the database system comprises a virtualized environment, wherein processing resources in the first compute node and the second compute node comprise virtualized workloads in a cloud computing network. In embodiments, one or more of the plurality of applications and the plurality of sidecar proxies are configured in the virtualized environment as virtual machines. In embodiments, one or more of the plurality of applications and the plurality of sidecar proxies are configured in the virtualized environment as containers.

In embodiments, the second compute node comprises a further plurality of applications. In such embodiments, it may be that the further plurality of applications are configured to generate access requests to access the database. In embodiments, the second plurality of access requests are generated by the further plurality of applications. In embodiments, the second compute node comprises a further plurality of sidecar proxies. In such embodiments, each of the further plurality of sidecar proxies is associated with a respective one of the further plurality of applications. In embodiments, the further plurality of sidecar proxies are configured to facilitate communication between the further plurality of applications and the second database proxy.

An optional first step of method 300, represented by item 301, comprises storing, at one or more of the plurality of sidecar proxies, failover address information for the second database proxy. In such embodiments, it may be that the redirecting is performed on the basis of the stored failover address information.

A second step of method 300, represented by item 303, comprises receiving, at the first database proxy, a first plurality of access requests to access the database. In embodiments, the first plurality of access requests are generated by the plurality of applications.

A third step of method 300, represented by item 305, comprises processing, at the first database proxy, the first plurality of access requests.

A fourth step of method 300, represented by item 307, comprises receiving, at the second database proxy, a second plurality of access requests to access the database.

A fifth step of method 300, represented by item 309, comprises processing, at the second database proxy, the second plurality of access requests.

A sixth step of method 300, represented by item 311, comprises monitoring for a failure event associated with the first database proxy. In embodiments, the monitoring is performed by at least one of the plurality of sidecar proxies in the first compute node. In embodiments, the monitoring comprises probing the first database proxy at predetermined intervals for confirmation of correct operation of the first database proxy.

A seventh step of method 300, represented by item 313, comprises, in response to the monitoring indicating a failure event associated with the first database proxy, initiating a failover procedure between the first database proxy and the second database proxy. In embodiments, the failure event comprises one or both of a failure of the first database proxy, and a communication failure associated with the first database proxy.

The failover procedure comprises a step, represented by item 315, of redirecting the first plurality of access requests to the second database proxy. In embodiments, redirecting the first plurality of access requests comprises, redirecting, by one or more of the plurality of sidecar proxies in the first compute node, access requests associated with the respective sidecar proxies to the second database proxy in the second compute node. In embodiments, redirecting the first plurality of access requests comprises redirecting, by one or more other of the plurality of sidecar proxies in the first compute node, access requests associated with the respective sidecar proxies to a third database proxy in a third compute node.

The failover procedure comprises a step, represented by item 317, of processing, at the second database proxy, the first plurality of access requests. In embodiments, the processing comprises accessing, by the second database proxy, the database to fulfil the redirected access requests in communication with the plurality of sidecar proxies in the first compute node.

An optional eighth step of method 300, represented by item 319, comprises, in response to the monitoring indicating recovery of the first database proxy, initiating a failover recovery procedure between the second database proxy and the first database proxy.

In embodiments, the failover recovery procedure comprises an optional step, represented by item 321, of, at the plurality of sidecar proxies, resuming facilitating communication of subsequent access requests to access the database with the first database proxy.

In embodiments, and the failover recovery procedure comprises an optional step, represented by item 323, of processing, at the first database proxy, the subsequent access requests.

Whilst the present disclosure has been described and illustrated with reference to particular embodiments, it will be appreciated by those of ordinary skill in the art that the present disclosure lends itself to many different variations not specifically illustrated herein. By way of example only, certain possible variations will now be described.

Whilst the embodiments illustrated in FIGS. 1 and 2 show only four and two compute nodes respectively, in alternative embodiments, database system 100 may comprise more or fewer compute nodes. In such embodiments, it may be that two or more (for example all) of the compute nodes in database system 100 are configured to operate substantially as described above in respect of first compute node 101*a*. Thus, in embodiments, each of the compute nodes may comprise a database proxy. In embodiments, each of the compute nodes is configured to monitor for a failure event associated with the respective database proxy. In embodiments, each of the compute nodes is configured to, in response to the monitoring indicating a failure event associated with the respective database proxy, redirect access requests associated with the database proxy to one or more alternative database proxies in one or more of the other compute nodes.

Embodiments of the present disclosure provide a method of operating a database system, the database system comprising:

a database;

a first compute node comprising a first database proxy; and a second compute node comprising a second database proxy and configured to receive a plurality of access requests to access the database and process the plurality of access requests;

the method comprising:
receiving, at the first database proxy, a further plurality of access requests to access the database;
processing, at the first database proxy, the further plurality of access requests;
monitoring for a failure event associated with the first database proxy; and
in response to the monitoring indicating a failure event associated with the first database proxy, initiating a failover procedure between the first database proxy and the second database proxy, the failover procedure comprising redirecting the further plurality of access requests to the second database proxy for processing at the second database proxy.

It will be appreciated that first database system 100 may comprise one or more processors and/or memory. Thus, in embodiments, first compute node 101a comprises a processor 213 and an associated memory 215. Processor 213 and associated memory 215 may be configured to perform one or more of the above-described functions of first compute node 101a. In embodiments, second compute node 101b comprises a processor and an associated memory (for example, configured to perform one or more of the above-described functions of second compute node 101b). It will be appreciated that, in embodiments in which database system 100 comprises more than two compute nodes, it may be that each of the compute nodes comprises a processor and associated memory (for example, configured to perform one or more of the functions of the respective compute node). Similarly, in embodiments, one or both of load balancer 107 and database 103 comprise a processor and an associated memory (for example, configured to perform one or more of the above-described functions of load balancer 107 and database 103). Each device, module, component, machine or function as described in relation to any of the examples described herein (for example, applications 205a, 205b, 205c, sidecar proxies 207a, 207b, 207c, and database proxies 201a, 201b) may similarly comprise a processor or may be comprised in apparatus comprising a processor. One or more aspects of the embodiments described herein comprise processes performed by apparatus. In some examples, the apparatus comprises one or more processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also include computer programs, particularly computer programs on or in a carrier, adapted for putting the above-described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

The one or more processors of the database system 100 may comprise a central processing unit (CPU). The one or more processors may comprise a graphics processing unit (GPU). The one or more processors may comprise one or more of a field programmable gate array (FPGA), a programmable logic device (PLD), or a complex programmable logic device (CPLD). The one or more processors may comprise an application specific integrated circuit (ASIC). It will be appreciated by the skilled person that many other types of device, in addition to the examples provided, may be used to provide the one or more processors. The one or more processors may comprise multiple co-located processors or multiple disparately located processors. Operations performed by the one or more processors may be carried out by one or more of hardware, firmware, and software.

The one or more processors may comprise data storage. The data storage may comprise one or both of volatile and non-volatile memory. The data storage may comprise one or more of random access memory (RAM), read-only memory (ROM), a magnetic or optical disk and disk drive, or a solid-state drive (SSD). It will be appreciated by the skilled person that many other types of memory, in addition to the examples provided, may also be used. It will be appreciated by a person skilled in the art that the one or more processors may each comprise more, fewer and/or different components from those described.

The techniques described herein may be implemented in software or hardware, or may be implemented using a combination of software and hardware. They may include configuring an apparatus to carry out and/or support any or all of techniques described herein. Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program. The carrier may comprise a computer readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the present disclosure that are described as preferable, advantageous, convenient or the like are optional and do not limit the scope of the independent claims. Moreover, it is to be understood that such optional integers or features, whilst of possible benefit in some embodiments of the present disclosure, may not be desirable, and may therefore be absent, in other embodiments.

What is claimed is:

1. A method of operating a database system,
the database system comprising:
a database;
a first compute node comprising:
a first database proxy;
a plurality of applications configured to generate access requests to access the database; and
a plurality of sidecar proxies each associated with a respective one of the plurality of application, the plurality of sidecar proxies being configured to facilitate communication of the first plurality of access requests between the plurality of applications and the first database proxy; and a second compute node comprising a second database proxy, the method comprising:

receiving, at the first database proxy, a first plurality of access requests to access the database, wherein the first plurality of access requests are generated by the plurality of applications;

processing, at the first database proxy, the first plurality of access requests;

receiving, at the second database proxy, a second plurality of access requests to access the database;

processing, at the second database proxy, the second plurality of access requests;

monitoring for a failure event associated with the first database proxy; and in response to the monitoring indicating a failure event associated with the first database proxy, initiating a failover procedure between the first database proxy and the second database proxy, the failover procedure comprising:

redirecting the first plurality of access requests to the second database proxy; and processing, at the second database proxy, the first plurality of access requests.

2. The method of claim 1, wherein the monitoring is performed by at least one of the plurality of sidecar proxies in the first compute node.

3. The method of claim 2, wherein redirecting the first plurality of access requests comprises, redirecting, by one or more of the plurality of sidecar proxies in the first compute node, access requests associated with the respective sidecar proxies to the second database proxy in the second compute node.

4. The method of claim 3, wherein the second database proxy is configured to access the database to fulfil the redirected access requests in communication with the plurality of sidecar proxies in the first compute node.

5. The method of claim 3, comprising storing, at one or more of the plurality of sidecar proxies, failover address information for the second database proxy, wherein the redirecting is performed on the basis of the stored failover address information.

6. The method of claim 3, comprising, in response to the monitoring indicating recovery of the first database proxy, initiating a failover recovery procedure between the second database proxy and the first database proxy, the failover recovery procedure comprising:

at the plurality of sidecar proxies, resuming facilitating communication of subsequent access requests to access the database with the first database proxy; and processing, at the first database proxy, the subsequent access requests.

7. The method of claim 3, wherein redirecting the first plurality of access requests comprises redirecting, by one or more other of the plurality of sidecar proxies in the first compute node, access requests associated with the respective sidecar proxies to a third database proxy in a third compute node.

8. The method of claim 1, wherein the monitoring comprises probing the first database proxy at predetermined intervals for confirmation of correct operation of the first database proxy.

9. The method of claim 1, wherein the database system comprises a virtualised environment, wherein processing resources in the first compute node and the second compute node comprise virtualised workloads in a cloud computing network.

10. The method of claim 9, wherein:

the first compute node comprises a plurality of applications configured to generate access requests to access the database;

the first plurality of access requests are generated by the plurality of applications;

the first compute node comprises a plurality of sidecar proxies, each associated with a respective one of the plurality of applications, the plurality of sidecar proxies being configured to facilitate communication of the first plurality of access requests between the plurality of applications and the first database proxy; and one or more of the plurality of applications and the plurality of sidecar proxies are configured in the virtualised environment as virtual machines.

11. The method of claim 9, wherein:

the first compute node comprises a plurality of applications configured to generate access requests to access the database;

the first plurality of access requests are generated by the plurality of applications;

the first compute node comprises a plurality of sidecar proxies, each associated with a respective one of the plurality of applications, the plurality of sidecar proxies being configured to facilitate communication of the first plurality of access requests between the plurality of applications and the first database proxy; and one or more of the plurality of applications and the plurality of sidecar proxies are configured in the virtualised environment as containers.

12. The method of claim 1, wherein the failure event comprises one or more of:

a failure of the first database proxy, and a communication failure associated with the first database proxy.

13. The method of claim 1, wherein:

the second compute node comprises a further plurality of applications configured to generate access requests to access the database;

the second plurality of access requests are generated by the further plurality of applications; and the second compute node comprises a further plurality of sidecar proxies, each associated with a respective one of the further plurality of applications, the further plurality of sidecar proxies being configured to facilitate communication between the further plurality of applications and the second database proxy.

14. A non-transitory computer-readable storage medium comprising computer-executable instructions which, when executed by a processor, cause a computing device to perform a method of operating a database system, the database system comprising:

a database;

a first compute node comprising:

a first database proxy;

a plurality of applications configured to generate access requests to access the database; and a plurality of sidecar proxies each associated with a respective one of the plurality of applications, the plurality of sidecar proxies being configured to facilitate communication of the first plurality of access requests between the plurality of applications and the first database proxy; and a second compute node comprising a second database proxy, the method comprising:
- receiving, at the first database proxy, a first plurality of access requests to access the database, wherein the first plurality of access requests are generated by the plurality of applications;
- processing, at the first database proxy, the first plurality of access requests;
- receiving, at the second database proxy, a second plurality of access requests to access the database;
- processing, at the second database proxy, the second plurality of access requests;
- monitoring for a failure event associated with the first database proxy; and
- in response to the monitoring indicating a failure event associated with the first database proxy, initiating a failover procedure between the first database proxy and the second database proxy, the failover procedure comprising:
  - redirecting the first plurality of access requests to the second database proxy; and
  - processing, at the second database proxy, the first plurality of access requests.

15. A database system comprising:
- a database;
- a first compute node comprising a first database proxy; and
- a second compute node comprising a second database proxy, wherein:
- the first database proxy is configured to receive a first plurality of access requests to access the database and to process the first plurality of access requests;
- the second database proxy is configured to receive a second plurality of access requests to access the database and to process the second plurality of access requests;
- the first compute node is configured to monitor for a failure event associated with the first database proxy and, in response to the monitoring indicating a failure event associated with the first database proxy, initiate a failover procedure between the first database proxy and the second database proxy; and
- the failover procedure comprises:
  - redirecting the first plurality of access requests to the second database proxy; and
  - processing, at the second database proxy, the first plurality of access requests.

* * * * *